United States Patent
Finlay et al.

(10) Patent No.: US 10,725,994 B2
(45) Date of Patent: Jul. 28, 2020

(54) AUTOMATICALLY REVISING SYNOPSIS TABLE STRUCTURE

(71) Applicant: International Business Machines Corporation, Armonk, NY (US)

(72) Inventors: Ian R. Finlay, Uxbridge (CA); Christian M. Garcia-Arellano, Richmond Hill (CA); Adam J. Storm, Toronto (CA); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 15/094,213

(22) Filed: Apr. 8, 2016

(65) Prior Publication Data
US 2017/0293649 A1    Oct. 12, 2017

(51) Int. Cl.
*G06F 16/22*     (2019.01)
*G06F 16/23*     (2019.01)
*G06F 16/215*    (2019.01)

(52) U.S. Cl.
CPC ........ *G06F 16/2282* (2019.01); *G06F 16/215* (2019.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 5,675,785 A | * | 10/1997 | Hall | G06F 16/24539 707/600 |
| 6,023,695 A | * | 2/2000 | Osborn | G06F 16/284 |
| 6,834,290 B1 | * | 12/2004 | Pugh | G06F 16/2282 707/803 |
| 7,603,339 B2 | * | 10/2009 | Cruanes | G06F 17/30442 |
| 8,359,316 B2 | | 1/2013 | Franke et al. | |
| 8,549,004 B2 | | 10/2013 | Lakshminarayan et al. | |
| 2007/0050322 A1 | * | 3/2007 | Vigesaa | G06F 17/246 |
| 2011/0167072 A1 | * | 7/2011 | Millett | G06F 16/319 707/747 |
| 2012/0089566 A1 | * | 4/2012 | Effern | G06F 16/213 707/611 |

(Continued)

FOREIGN PATENT DOCUMENTS

WO    2014020605 A1    2/2014

OTHER PUBLICATIONS

Raman et al., "DB2 with BLU Acceleration:So Much More than Just a Column Store", Proceedings of the VLDB Endowment, vol. 6, No. 11, pp. 1080-1091.

(Continued)

*Primary Examiner* — Christopher J Raab
(74) *Attorney, Agent, or Firm* — Edward J. Wixted, III

(57) ABSTRACT

Merging adjacent rows of a synopsis table so as to increase the effectiveness of the synopsis table regarding data skipping. Adjacent rows for merging are identified based on statistics regarding: (i) queries of the database; (ii) effectiveness of the synopsis table for data skipping; and (iii) usage of predicates in queries of the database. Once merged, the synopsis table is smaller, and more effective with respect to data skipping, while fewer computing resources (administrative, maintenance, memory, clock cycles, storage space, etc.) are needed to process the database queries.

18 Claims, 5 Drawing Sheets

(56) References Cited

U.S. PATENT DOCUMENTS

| | | | |
|---|---|---|---|
| 2013/0031229 A1* | 1/2013 | Shiga | G06F 17/3033 709/223 |
| 2014/0081918 A1 | 3/2014 | Srivas et al. | |
| 2014/0149433 A1* | 5/2014 | Lakshminarayan | G06F 17/30306 707/750 |
| 2014/0178328 A1* | 6/2014 | D'Agostino | A61K 9/0024 424/78.31 |
| 2015/0178328 A1 | 6/2015 | Stephan, III et al. | |
| 2015/0220650 A1 | 8/2015 | Wang et al. | |
| 2015/0347549 A1 | 12/2015 | Chang et al. | |
| 2016/0110417 A1* | 4/2016 | Lakshminarayan | G06F 17/18 707/718 |
| 2016/0378829 A1* | 12/2016 | Vengerov | G06F 17/30469 707/714 |
| 2017/0046367 A1 | 2/2017 | Chang et al. | |

OTHER PUBLICATIONS

Finlay et al., "Scan Optimization Using Bloom Filter Synopsis", U.S. Appl. No. 14/947,506, filed Nov. 20, 2015, 40 pages.

Finlay et al., "Automatically Revising Synopsis Table Structure", U.S. Appl. No. 15/474,020, filed Mar. 30, 2017, 38 pages.

IBM Appendix P, list of patents and patent applications treated as related, filed herewith, 2 pages.

* cited by examiner

|  | MIN_C1 | MAX_C1 | BLOOM_C1 | MIN_C2 | MAX_C2 | BLOOM_C2 | MIN_C3 | MAX_C3 | BLOOM_C3 | MINROWID | MAXROWID |
|---|---|---|---|---|---|---|---|---|---|---|---|
| ROW_1 | 5 | 20 | 1001101011100000 | 0 | 250 | 1110010111010001 | 10 | 10 | 1000100000000 | 16 | 40 |
| ROW_2 | 20 | 30 | 1011100000001000 | 0 | 100 | 1110000100011001 | 10 | 10 | 1000100000000 | 41 | 44 |
| ROW_3 | 5 | 30 | 1011101011101000 | 0 | 250 | 1110010111011001 | 10 | 10 | 1000100000000 | 16 | 44 |

AUTOMATICALLY REVISING SYNOPSIS TABLE STRUCTURE

BACKGROUND

The present invention relates generally to the field of data warehousing, and more particularly to enhancement of synopsis tables which are used to help in efficient access of databases (for example, relational databases). Conventional synopsis tables typically include synopsis table records, where each synopsis table record corresponds to a "block" of records in the corresponding database and includes information such as: (i) minimum value occurring in each field in the corresponding block; (ii) maximum value occurring in each field of the corresponding block; and/or (iii) Bloom filter related data (for example, a Bloom filter value) for the corresponding block. However, none of the foregoing types of summary data should be considered as required in order to have a "synopsis table," as that term is used herein.

A synopsis table is herein defined to be any auxiliary summary table corresponding to a database that facilitates finding data in the database. Some conventional synopsis tables include the minimum (MIN) and maximum (MAX) values present in columns of the main table, aggregated over a block of rows (for example 1024 rows as used in some conventional database systems). There is a row in the synopsis table for each "block" in the main table, but the number of database records in a block can vary from block to block, at least in some conventional synopsis table applications. "Block" is hereby defined to mean a set of database records that are grouped together for purposes of making a synopsis table. In some synopsis table applications, "blocks" are referred to by other names, such as "pages." Block definition refers to both the process of determining which database records are to be grouped together to make the blocks for a synopsis table, and to the resulting correspondence between database records and blocks.

Conventional synopsis tables are dynamically maintained in the sense that when rows are inserted or deleted in the main table (in some conventional database products, a row in a database table is referred to as a record), then the synopsis table is automatically (see definition in Definitions sub-section below) updated to reflect the addition and/or deletion of data in the database table with which the synopsis table corresponds.

Conventional data warehouse (DW) systems have massive tables (for example, tables structured as relational databases) that require large amounts of data to be read from them in order to answer analytical queries. Defining and maintaining traditional B-Tree or bit map indexes, and using these to answer queries, is a conventional solution used to help in efficient access of these massive tables. One conventional method is the use of synopsis tables and zone maps, which are used in some conventional DW systems. Synopsis tables address issues with administration and maintenance costs. As used herein, the terms "synopsis table" and "zone map" are used interchangeably, unless an explicit difference is called out.

SUMMARY

According to an aspect of the present invention, there is a method, computer program product and/or system that performs the following operations (not necessarily in the following order): (i) receiving an original version of a synopsis table comprising a plurality of synopsis table records, where the plurality of synopsis table records respectively correspond to a first plurality of blocks, with each block of the first plurality of blocks corresponding to a set of database record(s) stored in a database, and where each synopsis table record of the original version of the synopsis table includes fields having values that characterize data in fields of the respectively corresponding block of database records of the first plurality of blocks; (ii) tracking a set of usage statistic(s), including at least a first usage statistic, with each usage statistic of the set of usage statistic(s) relating to usage of the synopsis table and/or usage of the database; (iii) determining that the set of usage statistic(s) meet a first synopsis table re-organization condition, with the first synopsis table re-organization condition being an operational experiential type precondition, and on at least condition that the first synopsis table re-organization condition has been met, re-organizing the synopsis table.

BRIEF DESCRIPTION OF THE DRAWINGS

FIG. 4 is a portion of a synopsis table for use with embodiments of the present invention.

DETAILED DESCRIPTION

Figure 1A:
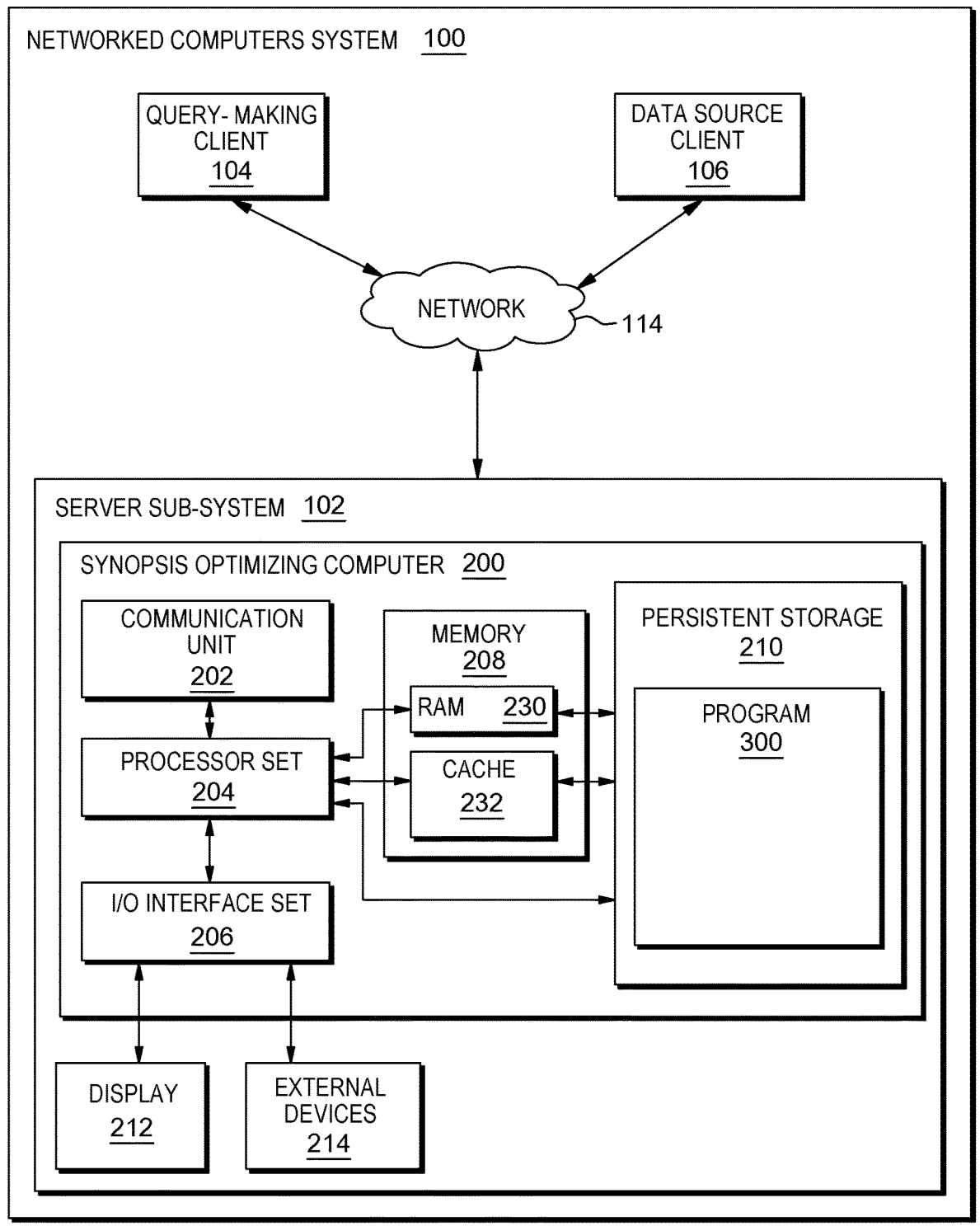
FIG. 1A is a block diagram of a first embodiment of a system according to the present invention.

Some embodiments of the present invention are directed to systems, methods and/or software for automatically and/or dynamically, updating synopsis tables where the update is based on usage statistics (for example, adding a threshold number of data blocks to the database triggers an update of the corresponding synopsis table). Some embodiments of the present invention are directed to updating a summary table in a way that is based on: (i) historic usage of the synopsis table; and/or (ii) historic usage of the database corresponding to the synopsis table.

Some embodiments of the present invention may include one, or more, of the following features, characteristics and/or advantages: (i) merges adjacent, but non-overlapped, zone map (or synopsis table) entries; (ii) reduces storage space needed for the synopsis table (for example, zone map) itself; (iii) merges adjacent, non-overlapped entries where a number of base tuples represented is relatively low (for example, below a predetermined threshold); (iv) optimizes storage of a synopsis table by automatically combining adjacent rows of the synopsis table; and/or (v) enhances performance of reading and processing of synopsis tables. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
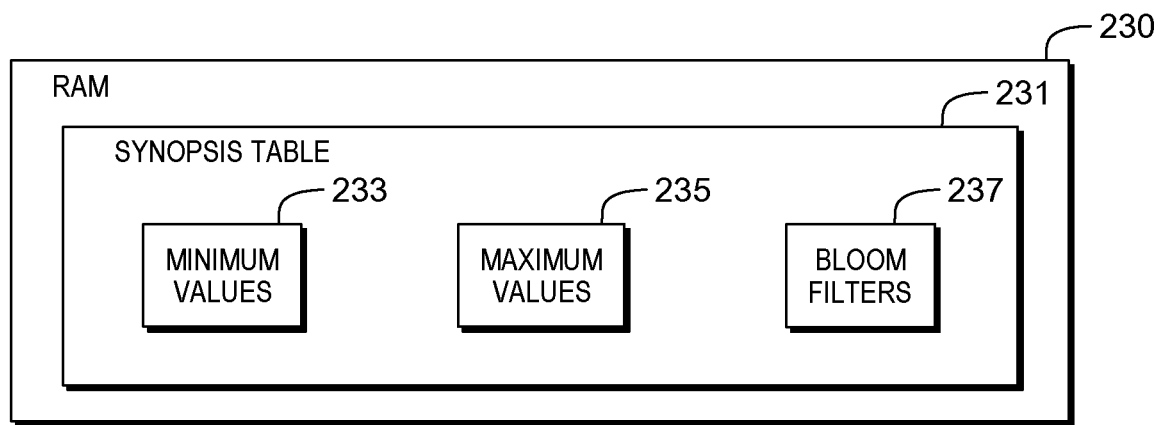
FIG. 1B shows a random access memory portion of the first embodiment system.
Figure 1C:
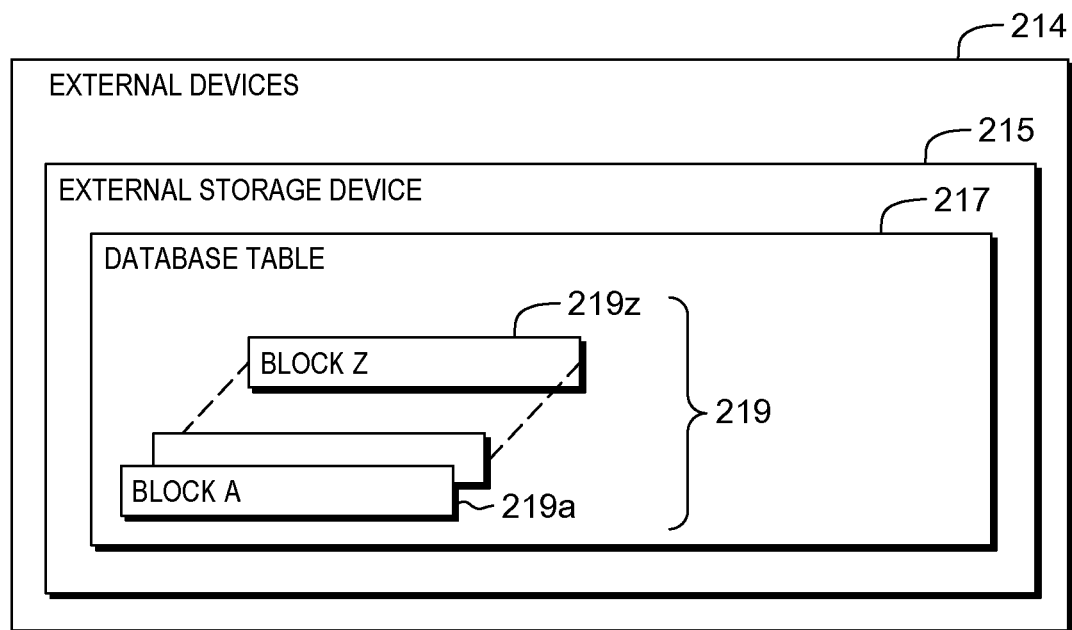
FIG. 1C shows an external devices set portion of the first embodiment system.

An embodiment of a possible hardware and software environment for software and/or methods according to the present invention will now be described in detail with reference to the Figures. FIG. 1A is a functional block diagram illustrating various portions of networked computers system 100, including: server sub-system 102; query-making client 104; data source client 106; communication network 114; synopsis optimizing computer 200; communication unit 202; processor set 204; input/output (I/O) interface set 206; memory device 208; persistent storage device 210; display device 212; external device set 214; random access memory (RAM) devices 230; cache memory device 232; and program 300. FIG. 1B shows RAM 230 of FIG. 1A. RAM 230 includes: synopsis table 231; minimum values 233; maximum values 235; and bloom filters 237. FIG. 1C shows external devices 214 of FIG. 1A. External devices 214 include: external storage device 215; database table 217; block A through block Z, respectively 219a through 219z, collectively blocks 219.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with synopsis optimizing computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
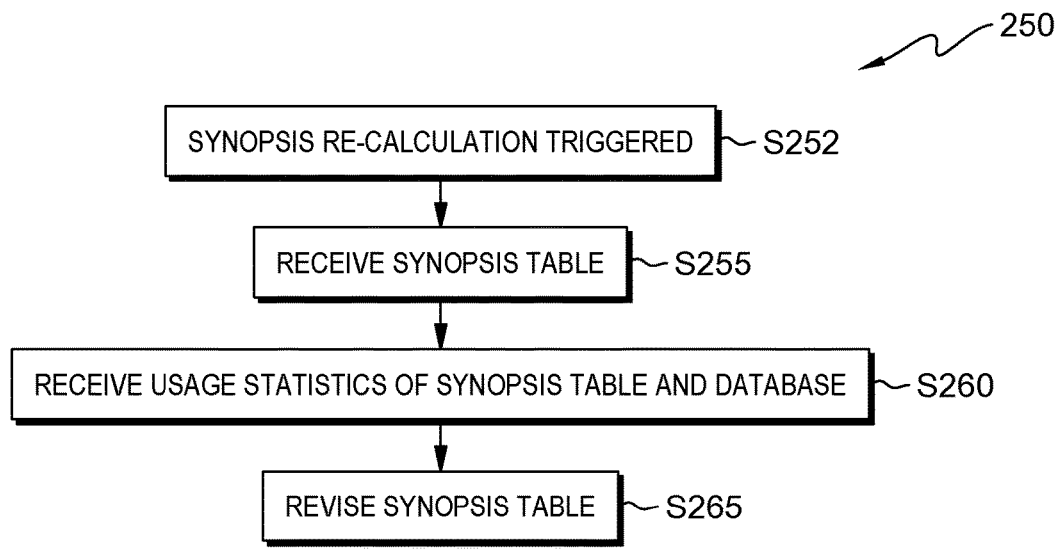
FIG. 2 is a flowchart showing a method performed, at least in part, by the first embodiment system.
Figure 3:
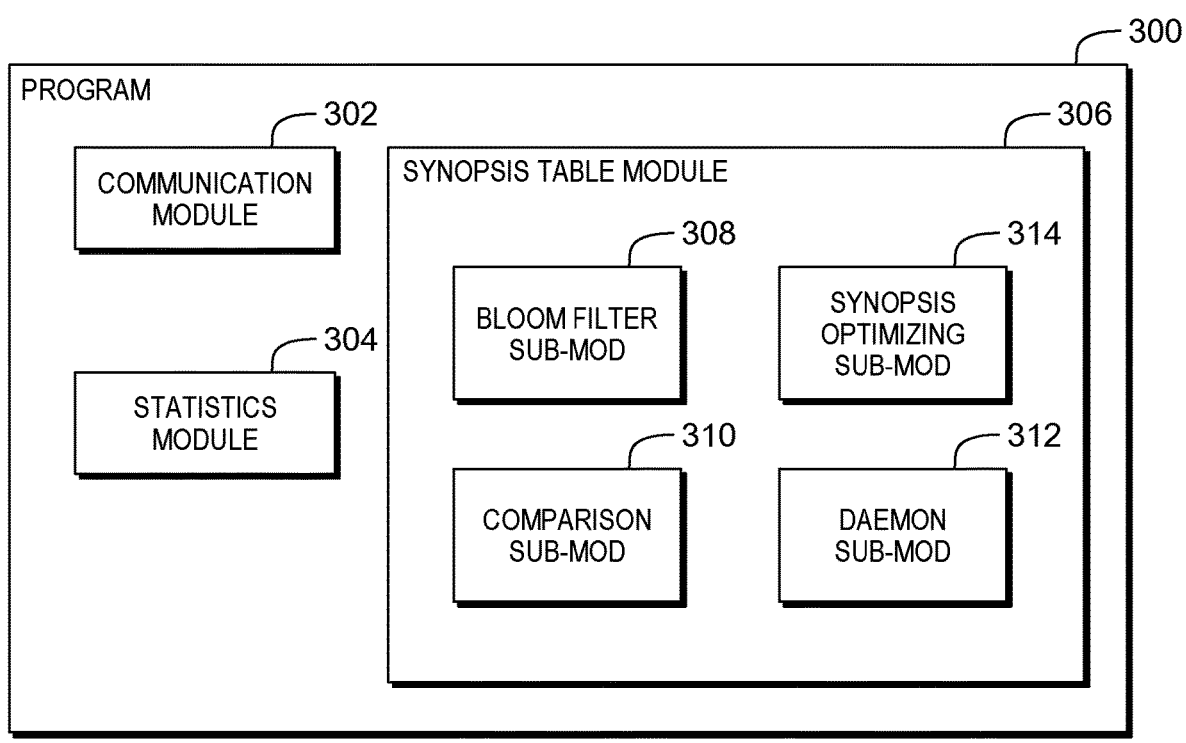
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Note: In some embodiments of the present invention, the conventional database terms "record" and "field" are sometimes also referred to respectively as "row" and "column". As used herein, and with respect to both a database table and a synopsis table, "row" and "record" are synonymous and may be used interchangeably. Similarly, "column" and "field" are synonymous and may be used interchangeably.

In some embodiments of the present invention, a Bloom filter is constructed and used to test whether a value in a database query is present in a block of data. False positive matches are possible, but false negatives are not. A Bloom filter test yields one of two possible outcomes: (i) the tested value does not exist in the block of data represented by the Bloom filter; or (ii) the tested value may (or may not) exist in the block of data represented by the Bloom filter.

Processing begins at operation S252, where a recalculation of a first synopsis table is triggered. In this embodiment, a synopsis table reorganization is triggered by a type of precondition which is herein referred to as an "operational experiential precondition" (see definition, below, in the Definitions sub-section of this Detailed Description section). In this example, the specific operational experiential type preconditions are as follows: (i) a pre-determined number of records are deleted from a block in the database; (ii) percentage of data that is skipped (during scans) declines below a pre-determined threshold; (iii) the database, or a database table is re-configured (for example, by clustering, compaction, and/or a change in the default block size, etc.); (iv) effectiveness of a Bloom filter (see definition in the Definitions sub-section of this Detailed Description) declines below a pre-determined threshold; and/or (v) a large number of inserts into the database are made, where each insert includes a small number (much fewer than the default block size) of inserted records and each insert results in a new row added to the synopsis table. Alternatively, other embodiments may: (i) use a sub-set of the foregoing operational experiential type preconditions; and (ii) use additional, and/or alternative, operational experiential type precondition(s).

In some embodiments, daemon sub-module 312 (a background process), of synopsis table module 306, of program 300, is periodically activated in response to events listed above, or upon other events, such as at pre-determined time intervals. The daemon automatically determines whether to trigger recalculation of the synopsis table.

Processing continues at operation S255, where synopsis optimizing computer 200 of server sub-system 102, of networked computers system 100 (see FIG. 1A), receives, via communication module 302, of program 300, at least a portion of synopsis table 231. For example, if a query of database table 217 is to be conducted, and the query includes a predicate specifying a particular value for a column of the database table, a portion of synopsis table 231 that includes information about the column of the database table is received by the synopsis optimizing computer.

In this embodiment, synopsis table 231 includes, for each "block" 219a to 219z (a block is a set of rows) of a corresponding database table 217 stored in external storage device 215 (see FIG. 1C): a minimum ("MIN") value 233; a maximum ("MAX") value 235; and/or a Bloom filter 237. A Bloom filter is a form of a probabilistic data structure (see definition for Bloom filter, below, in the Definitions sub-section of this Detailed Description section).

Processing proceeds to operation S260, where statistics module 304 of program 300, receives usage statistics with respect to database table 217 (see FIG. 1C) and synopsis table 231. The usage statistics include information pertaining to: (i) inserts, deletes, and updates applied to the database table; (ii) usage (for example, a statistical distribution) of predicates in queries with respect to columns of the database table; (iii) types of predicates applied in queries with respect to the columns of the database table; (iv) percentage of data that is skipped during scans of the database table; (v) lists (or ranges) of blocks 219 in the database table, the blocks having newly inserted or deleted rows; (vi) frequency of predicates used with respect to the various columns in the database table; (vii) density of Bloom filters 237 in the synopsis table; and/or (viii) usage and effectiveness of the synopsis table, etc. Further with respect to item (vii) above, the density of a Bloom filter is a measure of the proportion of bits of the Bloom filter that are set to logical 1. If half the bits are set to 1, the density of the Bloom filter is 50%. As the density increases, the Bloom filter effectiveness tends to decrease. In the extreme case, if the density is 100% (all bits are set to logical 1), the Bloom filter offers no benefit in terms of data skipping.

Further with regard to item (iv) in the paragraph above, in some embodiments of the present invention, data skipping occurs during a scan of a database table, the scan being conducted, for example, in response to a query that specifies a predicate with respect to a database column. A synopsis table can help identify block(s) of the database table that do not include values as per the specified predicate in the specified column, without having to scan the block(s) (for example by operations performed by bloom filter sub-mod 308 and comparison sub-module 310, both of synopsis table module 306 of program 300). Blocks so identified are excluded from the scan (this is called data skipping). Data skipping can thereby significantly decrease the time and resources required to complete a database scan.

Processing proceeds to operation S265, where statistics module 304 analyzes synopsis table 231, and the relevant statistics, to determine which (if any) rows in the synopsis table should be merged. Discussion of some conditions under which rows in a synopsis table should be merged will be found below, in sub-section III, of this detailed description.

Alternatively, in some embodiments of the present invention, statistics module 304, upon analysis of the synopsis table 231 and the relevant statistics, determines that a row in the synopsis table should be split into two or more rows. For discussion herein, such a synopsis table row will be referred to as an overloaded row, and the corresponding block in the database as an overloaded data block. Example conditions where a synopsis table row is overloaded and potentially should be split into two or more rows, includes, without limitation: (i) a Bloom filter having all, or nearly all, bits set to 1; and/or (ii) the range, defined by the minimum and maximum values in the synopsis table for a column of a data block, is too large, which reduces a data-skipping benefit. If the target value is outside the range defined by the minimum and maximum values known to exist in the block of data, as recorded in the synopsis table, the block of data need not be scanned.

Alternatively, in some embodiments of the present invention, statistics module 304, in response to analysis of the synopsis table and the statistics, determines that the database should be re-configured. For example, assume there is significant overlap (of ranges defined in the synopsis table for minimum and maximum values) from one data block to another. In such a case, it may be advantageous to reconfigure the database by means of sorting, clustering, compaction, or other techniques and then compute a new (updated) synopsis table based on the re-configured database.

In some embodiments of the present invention, an overloaded synopsis table row is split into two rows by (conceptually) splitting in half the corresponding overloaded data block, and computing a new synopsis table row for each of the two resulting data blocks. In other embodiments, the overloaded data block is split into two or more data blocks of equal, or unequal, sizes, based on data in the data block, such that the respectively corresponding resultant synopsis table rows are predicted to have optimal data skipping benefits.

In some embodiments of the present invention, if statistics module 304 determines that a row of the synopsis table should be merged with an adjacent row, synopsis optimizing sub-module 314 of synopsis table module 306 of program 300, merges the adjacent rows into a new row that replaces the two rows being merged, thereby generating a revised synopsis table 231. Alternatively, if the statistics module determines that an overloaded row of the synopsis table should be split into two or more new rows, the synopsis optimizing sub-module performs the split, and replaces the overloaded row with the two or more new rows, thereby generating a revised synopsis table.

In some embodiments of the present invention, the synopsis re-calculation of operation S252 is triggered by daemon sub-module 312 of synopsis table module 306. The daemon sub-module rebuilds portions of the synopsis table that may have become outdated, such as occurs when deletes are performed on the main table. The synopsis table is not necessarily updated (in "real time") when a row is deleted from the main table (and this is acceptable). However, as rows continue to be deleted from the main table, the synopsis table progressively becomes more outdated (that is, it becomes progressively less effective in data skipping performance due, for example, to an increasing number of false positive Bloom filter comparison results and/or false positive min/max comparison results).

In some embodiments of the present invention, daemon sub-module 312 is activated in response to various events, including without limitation: (i) a pre-defined number of rows are inserted, updated or deleted from the main database since a previous recalculation of the synopsis table 231 took place; (ii) a pre-defined number of queries are performed against the database; (iii) average latency of database queries rises above a pre-defined threshold; (iii) a significant decline is measured in the percentage of database blocks (and/or rows, and/or pages) that are skipped during database queries; and/or (iv) expiration of a pre-defined time interval since a previous activation of the daemon, etc.

Pages do not necessarily contain a fixed number of records. The number of records in a page is based, at least in part, on the width of a row and, in some cases, a partially filled page. A synopsis table reorganization may include consolidation of adjacent pages into a single page. Alternatively, a synopsis table reorganization may include associating multiple pages of the main table to a single row in the synopsis table. In contrast to a page, with a stride of rows, adjacent strides are consolidated by merely recording the range of record ids that define the block.

In some embodiments of the present invention, modifying the synopsis table is considered to be re-defining at least some blocks of the underlying database records. For example, consider a first synopsis table row that corresponds to database records 101 through 150, and an adjacent second synopsis table row that corresponds to database records 151 through 200. In this example, the synopsis table defines database records 101 through 150 as a first block and database records 151 through 200 as a second block. If the first and second synopsis table records are merged, the merged synopsis table record then corresponds to a new block of database records (rows 101 through 200), and the first and second blocks of database records are no longer defined as distinct blocks of database records. The foregoing is an example of re-defining at least some of the blocks of database records.

In some embodiments of the present invention, a synopsis table record is split into two records. For example, consider a first synopsis table row that corresponds to database records 501 through 600. In this example, the first synopsis table row defines database records 501 through 600 as a first block of database records. If the first synopsis table row is split into two records, for example into a second synopsis table row that corresponds to database records 501 through 550 and a third synopsis table row that corresponds to database records 551 through 600, the first block of database records (501 through 600) no longer exists as a distinct block, but is re-defined as a second block of database records (501 through 550) and a third block of database records (551 through 600). The foregoing is another example of re-defining at least some of the blocks of database records.

III. Further Comments and/or Embodiments

Some embodiments of the present invention recognize conditions wherein a synopsis table, associated with a larger database system, is of less than optimal configuration, and, in response to recognition of a sub-optimal synopsis table, automatically re-configure the synopsis table. Automatic re-configuration may include merging adjacent rows of the synopsis table. Merging adjacent rows decreases the size of the synopsis table and improves the overall query performance with a smaller synopsis table read during a query scan of a main database table. Splitting a synopsis table row into two separate blocks, on the other hand, while potentially increasing the size of the synopsis table enhances data skipping if the data in the main table is reorganized to be better clustered or sorted on key predicate columns.

Some embodiments of the present invention allow for efficient access of massive tables in a way that avoids the administrative, maintenance and/or storage costs associated with objects such as B-Tree or bit map indices.

In some embodiments of the present invention, each row of a synopsis table corresponds to a block of data in the main table. For every column of the main table that is characterized in the synopsis table (note: not all columns of the main table are necessarily characterized in the synopsis table), each row of the synopsis table includes three values: (i) the minimum value (MIN) in the corresponding block; (ii) the maximum value (MAX) in the corresponding block; and (iii) the Bloom filter corresponding to the data in the block. Synopsis tables are most effective when the data is clustered on frequently used predicate columns that are very selective.

In some embodiments of the present invention for insert, update and delete efficiency: (i) a synopsis table is automatically maintained when data is inserted into the main table; (ii) rows are not inserted into an existing block and therefore, a synopsis table row that corresponds to the existing block is not updated; (iii) a synopsis table is not maintained when rows are deleted in the main table; (iv)

when a full extent is empty, the corresponding rows in the synopsis table are removed (until the rows in the synopsis table are removed, the MIN or MAX and/or BLOOM filter values that were set when the block was first created may be lower, higher or a superset respectively of the values without the deleted rows); and/or (v) an update is treated as a delete followed by an insert, therefore an update is treated with a combination of the above treatments for deletes and inserts.

In some embodiments of the present invention, the conventional database terms "record" and "field" are sometimes also referred to respectively as "row" and "column". As used herein, and with respect to both a database table and a synopsis table, "row" and "record" are synonymous and may be used interchangeably. Similarly, "column" and "field" are synonymous and may be used interchangeably.

In some embodiments of the present invention, a database table and a synopsis table are each represented as a tabulation of data having records (rows of data), each record having one or more fields (columns). This construct is well known in the database field. While some conventional database management systems use two dimensions (records and fields), nothing in this disclosure is intended to limit a database or a synopsis table to a two dimensional construct. Higher dimensions are contemplated herein, such as a cubical construct having three dimensions such as for example, layers, records, and fields. For convenience only, and without limitation, discussion herein is limited to the tabular (two-dimensional) construct.

In some embodiments of the present invention, the synopsis table is serialized as a column-oriented table. During a database search, only the parts of the synopsis table that are relevant to the search are loaded into memory. For example, if a search query has a predicate " . . . where C1=5" (the query seeks all database records that have the value "5" in column C1), only the part of the synopsis table that represents column "C1" of the database need be searched (for example, loaded into RAM for fast searching).

A Bloom filter for a block of data is a set of bits (a bit pattern) that is based on a hash function (or a plurality of hash functions) applied to values in a column, of a block of data. The Bloom filter is a bitwise logical OR, collectively applied to the hash function results for each of the values present in the column of the block of data. A more general Bloom filter definition is given below in section IV Definitions.

Usage of a Bloom filter will now be illustrated with reference to the following hypothetical example. Assume a Bloom filter for column C1 is determined to have this bit pattern: [1011 1000]. Next, consider a query that includes the predicate "C1=5". Assume application of the hash function(s) to the value "5" yields the bit pattern [1000 0010], with a "1" in each of the first and seventh positions. It can then be concluded, without scanning the data block in the main table, that the value "5" does not exist in column C1 of the data block, because if it did exist, there would be a "1" in both the first and seventh positions in the Bloom filter. But the seventh position of the Bloom filter in this example is 0.

Even if the data is not well clustered, the Bloom filter can be exploited to more effectively handle various forms of predicates including equality, IN and OR predicates.

Some embodiments of the present invention assume that the synopsis table keeps both the MIN and MAX values as well as the Bloom filter (sometimes referred to here as BLOOM) for each column in the main table with as many rows in the synopsis table as there are blocks in the main table.

Synopsis tables are not effective if too many rows in the main table are represented by a single row in the synopsis table (meaning the block size is too large). This results in the MIN and MAX values in each row of the synopsis table approaching, or equal to, the entire range of values in the column in the main table (especially if the data is not clustered and/or sorted on the column). Similarly the greater the number of values that are represented in the Bloom filter, the greater is the likelihood that the Bloom filter will be very dense with "1"s and consequently, not very effective (yields too many false positives, that is false positives that occur more frequently than a pre-determined threshold).

Conversely, representing fewer rows in the main table (smaller blocks) with a single row in the synopsis table effectively enables the database system to avoid having to read blocks of rows or pages from the main table (referred to as data skipping). However, the synopsis table itself becomes correspondingly larger and occupies significant amounts of memory and processing resources to read and use it. In addition, with every column in the main table represented by 3 columns in the synopsis table (MIN, MAX and BLOOM), the synopsis table can occupy significant storage space if the block size is too small.

Some embodiments of the present invention may include one, or more, of the following features, characteristics and/or advantages: (i) merges adjacent non-overlapped zone map entries; (ii) addresses the overlapped values case; (iii) focuses on reducing the storage space for the zone map itself; (iv) merges adjacent non-overlapped entries where the number of base tuples represented is low; (v) optimizes synopsis table storage usage by automatically combining adjacent rows of the synopsis table; (vi) recursively merges adjacent rows of the synopsis table provided proper conditions for merging adjacent rows are met at each iteration; and/or (vii) optimizes synopsis table reading and processing performance.

Some embodiments of the present invention monitor synopsis table usage and automatically optimize the storage of synopsis tables by combining adjacent synopsis table rows. This helps to minimize the cost of reading the synopsis table without significant loss of data skipping effectiveness (skipping regions of the main table during execution of a query that are known not to contain a value being searched).

Some embodiments of the present invention optimize synopsis table size and effectiveness, by using an optimum block size. If the block size is too large, the synopsis table is small but not very effective. For example with a large block size, the MIN and MAX values might cover almost the entire range of values in the main table, which largely negates a potential benefit of the synopsis table (skipping data in the main table during scans). In contrast, if the synopsis table is too small, it will contain a large number of rows and a scan of the synopsis table itself will be expensive (in terms of time and/or computing resources) and consequently also negate much of the potential data skipping benefit.

In some embodiments of the present invention to reduce maintenance and contention associated with modifying the synopsis table when a small number (smaller than the block size) of rows are inserted into a database table, a synopsis row is created with the COMMIT of each INSERT. For an operation to insert a large (greater than the default block size) number of rows, into the table, the insertion operation can be viewed as carrying out a number of insertions, each one inserting no more rows into the main table than the block size. A row in the synopsis table is created respectively corresponding to each insertion. For example, consider insertion of 2,500 rows into a database table where the block size is 1,000 rows. The operation is can be viewed as being accomplished using three insertions: two insertions of 1,000 rows each, and one insertion of 500 rows. Three rows, respectively corresponding to the three insertions, are added to the synopsis table. For efficiency reasons the synopsis table rows are typically buffered and written as appropriate.

In like fashion, for large number of insertions each involving much fewer than the default block size (a "small insertion"), a row is added to the synopsis table, respectively corresponding to each insertion transaction that is committed. A large number of small insertions may cause the synopsis table to grow too large, and making it expensive to read (in terms of time, memory, and processor resources), reducing query performance.

To maintain effectiveness of the synopsis table, the following takes place in some embodiments of the present invention: (i) statistics are maintained regarding each insertion and deletion applied to the database table (note, the synopsis table itself is not maintained "on the fly" for deletions); (ii) a background daemon (a background process) is periodically activated; and/or (iii) based on the statistics, the daemon combines adjacent rows in the synopsis table, automatically compacting the synopsis table to keep it small yet effective at the same time.

Some embodiments of the present invention may include one, or more, of the following features, characteristics and/or advantages: (i) automatically optimize the storage and read costs of synopsis tables; (ii) monitor synopsis table usage and effectiveness; (iii) combine (consolidate) adjacent rows in the synopsis table; (iv) consolidate synopsis table rows that correspond to small inserts into the main table; (v) re-compute synopsis table values based on corresponding blocks in the main table that have a significant number of rows deleted, and then consolidate adjacent, sparsely populated blocks; and/or (vi) consolidate adjacent rows in the synopsis table when the minimum, maximum and Bloom filter values in a synopsis table row match the respectively corresponding values in an adjacent row.

Further with regard to item (ii) in the paragraph above, monitoring synopsis table usage and effectiveness is performed by keeping statistics on: (i) the number of times (or other usage aspects) predicates are applied in queries for each respective column in the main table; (ii) the predicate types; (iii) the percentage of data skipped; (iv) the number of updates, deletes or inserts (in some embodiments, an update is effected by a delete of the old record and a corresponding insert of the updated record); and/or (v) the ranges of blocks with newly inserted or deleted rows in the main table.

In some embodiments of the present invention, a tuple including MIN, MAX, and BLOOM occupies three columns in the synopsis table for each relevant column in the main table. A relevant column in the main table is a column that is characterized in the synopsis table. The synopsis table does not necessarily characterize all columns in the main table. MIN, MAX, and BLOOM respectively denote the minimum, maximum and Bloom filter columns in the synopsis table.

In some embodiments of the present invention, for the purpose of monitoring the system, the following in-memory structure is maintained to keep track of delete and insert activity on the synopsis table: STRUCT2 (NUMROWSINSERTED, RANGEINSERTMIN, RANGEINSERTMAX, AVGROWSINSERTEDPERBLOCK, NUMDELETES, RANGEDELETESMIN, RANGEDELETESMAX, RANGEDELETELIST[ . . . ]), where:

STRUCT2 is the name of the in-memory structure;

NUMROWSINSERTED is the number of records inserted since the last reorganization;

AVGROWSINSERTEDPERBLOCK is the average number of newly inserted rows inserted in each block in the main table;

RANGEINSERTMIN is the minimum tuple sequence number (TSN) among the inserted records;

RANGEINSERTMAX is the maximum TSN among the inserted records;

NUMDELETES is the number of deleted records;

RANGEDELETESMIN is the minimum TSN among the deleted records;

RANGEDELETESMAX is the maximum TSN among the deleted records; and

RANGEDELETELIST[ . . . ] a list (or range) of the records deleted.

In some embodiments of the present invention, the in-memory data structure, STRUCT2, is written to disk periodically (for example, once per hour). It is not necessary that STRUCT2 has the most up-to-date information. STRUCT2 is flushed to disk at database stop time. At database start time, the (STRUCT2) information is brought into memory from the disk. Abnormal failure may cause loss of some recent updates, but this is acceptable. Periodically the synopsis table reorganization daemon automatically combines adjacent rows, based on the statistics and their respectively corresponding threshold values. The number of rows in the synopsis table are reduced by combining multiple adjacent blocks that may have been generated by numerous small inserts.

If NUMROWSINSERTED is greater than zero, and AVGROWSINSERTEDPERBLOCK is below a threshold, the blocks covered by RANGEINSERTMIN and RANGEINSERTMAX may be inspected to reorganize and consolidate to a fewer number of blocks. In some embodiments of the present invention, for these synopsis table rows, adjacent rows in the synopsis table are merged. The merged row MIN is the lesser of the two MIN values of the adjacent rows being merged. The merged row MAX is the greater of the two MAX values of the adjacent rows being merged. The merged row Bloom filter is the bitwise logical OR of the two Bloom filters from the adjacent rows being merged. The merged row replaces the two adjacent rows. In some embodiments for multiple contiguous blocks within the range of blocks with newly inserted rows, the data in the main table may be sorted on key predicate columns and the corresponding synopsis table rows have the MIN, MAX and BLOOM values recomputed. This local reorganization of the main table helps cluster the data on the key columns and improves the effectiveness of the synopsis for those blocks. Once the adjacent rows are merged and consolidated, NUMINSERTS, AVGROWSINSERTEDPERBLOCK, RANGEINSERTMIN, RANGEINSERTMAX are each set equal to zero.

Some embodiments of the present invention automatically trigger a re-computation of MIN, MAX and Bloom filter when NUMDELETES is above a threshold, to rebuild the synopsis row and consolidate adjacent rows in the synopsis table that encompass a significant number of DELETEs in the main table.

STRUCT2 maintains a count of the number of deleted rows (NUMDELETES) and at least the range of blocks (RANGEDELETESMIN and RANGEDELETESMAX), in the main table, that have had rows deleted. Some embodiments of the present invention maintain a list of blocks in the main table corresponding to each synopsis table row that have had rows deleted, (BLOCKDELETELIST[ . . . ]), Typically this works well for typical warehouse fact tables where the data is rolled out by date. For example anything older than 10 years is deleted periodically.

In some embodiments of the present invention, the MIN, MAX and Bloom filter values remaining in the range or list of blocks that have had rows deleted, are recomputed based on scans of those blocks within the range RANGEDE-LETESMIN and RANGEDELETESMAX in the main table. The synopsis table values are updated automatically in accordance with the scans. After the revision of the synopsis table, the corresponding in-memory structure elements are reset accordingly to start accumulating statistics for future deletes.

In some embodiments of the present invention, when the MIN, MAX and BLOOM values in a row of the synopsis table match the respectively corresponding values in an adjacent row, the rows are merged.

In some embodiments of the present invention, adjacent rows are merged if: (i) they have adjacent ranges (they represent adjacent ranges in the main table); (ii) they have monotonically increasing values (for example, a transaction ID that increments with each new transaction); (iii) monotonically non-decreasing values (for example, transaction date); and (iv) all other synopsis values (MIN, MAX and BLOOM) are respectively the same. In such cases, block sizes larger than the default (or otherwise optimum) size can be used advantageously.

Synopsis table 400 of FIG. 4, shows an example to illustrate merging of two adjacent synopsis table rows (such as might be done, in some embodiments of the present invention, subsequent to deletion of rows from the relevant block of the main table). The merged synopsis table row includes MIN, MAX and BLOOM corresponding to data in the rows remaining in the block.

With reference now to synopsis table 400, assume that a first block is adjacent to a second block in the main table, and the two blocks (not shown in the figures) are respectively characterized by ROW_1 and ROW_2 in the synopsis table. The minimum, maximum and Bloom values of column 1 for the first block of the main table, are respectively tabulated in columns MINT_C1, MAX_C1 and BLOOM in ROW_1 of the synopsis table. Similarly, the minimum, maximum and BLOOM values of column 1 for the second block are represented in the respective columns of ROW_2. In like manner, columns 2 and 3 of the first and second blocks of the main table are represented in the corresponding cells of the synopsis table. The first block has 25 rows, with ROWIDs between 16 and 40 inclusive (refer to columns MINROWID and MAXROWID for ROW_1). Similarly, the second block has 4 rows, with ROWIDs between 41 and 44 inclusive (see columns MINROWID and MAXROWID for ROW_2).

ROW_3 in synopsis table 400 results from merging ROW_1 and ROW_2. ROW_3 characterizes both the first and second blocks, now treated as combined into a single block of the main table. As shown in ROW_3, the smaller value (5) in ROW_1 and ROW_2 of column MINT_C1 is the value in ROW_3. The larger value (30) in ROW_1 and ROW_2 of column MAX_C1 is the value in ROW_3. The BLOOM_C1 value in ROW_3 is a bitwise logical OR of the BLOOM_C1 values in ROW_1 and ROW_2. Similarly, for columns 2 and 3 of the main table, the minimum, maximum and BLOOM values are in the respective columns of ROW_3. The new (merged) block in the main table includes ROWIDs from 16 to 44 inclusive. After ROW_1 and ROW_2 are merged into new ROW_3, ROW_1 and ROW_2 are deleted from the synopsis table.

Alternatively, in some embodiments of the present invention, each row in a synopsis table, such as synopsis table 400, characterizes a single block of data in a single column of the main table. Other columns of the main table are respectively characterized by other synopsis tables. In such a configuration, each column of the main table is represented in its corresponding synopsis table and its blocks are identified independently from the block identifications given to other columns of the main table.

In some embodiments of the present invention, adjacent rows of a synopsis table are iteratively combined until a block size is substantially optimized (meaning, not so small as to be unacceptably expensive to read too many rows of the synopsis table, and not so large as to have unacceptably poor effectiveness with respect to data skipping).

In some embodiments of the present invention adjacent rows of a synopsis table are consolidated based on statistics derived from monitoring of synopsis table usage for each main table column, the statistics including: (i) number of times predicates are applied; (ii) predicate types applied; (iii) percentage of data skipped; (iv) number of updates, deletes and inserts performed (in the main table); and/or (v) ranges of blocks having newly inserted or deleted rows in the main table. When consolidating blocks of data, attention is paid to the synopsis columns corresponding to the most common and selective predicates used in queries to maximize the effectiveness of the synopsis table. A tuple including MIN, MAX, and BLOOM are used respectively to denote minimum, maximum and Bloom filter columns in the synopsis table. Each tuple corresponds to a particular column in the main table. A main table having a plurality of columns is represented with up to the same plurality of tuples in the synopsis table. In some embodiments, not every column of the main table is characterized in the synopsis table, and therefore, the synopsis table includes fewer [MIN, MAX, BLOOM] tuples than the number of columns that exist in the main table.

In-memory structures are maintained based on INSERTs and DELETEs applied to the main table. To track most recent delete and insert activity on the synopsis table, the in-memory structures include: (i) the number of rows inserted; (ii) the average number of rows inserted per block; (iii) the minimum TSN among the rows inserted; (iv) the maximum TSN among the rows inserted; (v) the number of rows deleted; (vi) the minimum value (in each column) among the rows deleted; (vii) the maximum value (in each column) among the rows deleted; and/or (viii) a list (and/or range, if contiguous) of the rows deleted.

In some embodiments of the present invention, consolidation of adjacent rows in the synopsis tables is accomplished by performing one or more of the following operations: (i) combining multiple adjacent blocks that are generated by individual rows (or a predefined number of rows) inserted into the main table; (ii) after the number of deletes (NUMDELETES, refer to the in-memory structure discussed above in this sub-section) performed reaches a predefined threshold, automatically trigger a re-computation of values in rows of the synopsis table based on a scan of the respectively corresponding blocks of the main table, and based on the re-computed values, combining adjacent rows where indicated; (iii) when the minimum, maximum and Bloom filter values in a row of the synopsis table match the respectively corresponding values in an adjacent row; and/or (iv) when adjacent rows have adjacent ranges of monotonically increasing values (for example, a transaction ID) or monotonically non decreasing values (for example, a transaction date), and all other respectively corresponding synopsis MIN, MAX and BLOOM values are the same.

Further to item (i) in the paragraph above, when rows have been inserted and there are a predefined number of blocks (or synopsis table rows) covered by RANGEINSERTMIN and RANGEINSERTMAX, representing a predefined number of rows in the main table, for the respectively corresponding synopsis table rows, merge adjacent rows and once merged, set NUMINSERTS, RANGEINSERTMIN, RANGEINSERTMAX to zero.

Figure 5:
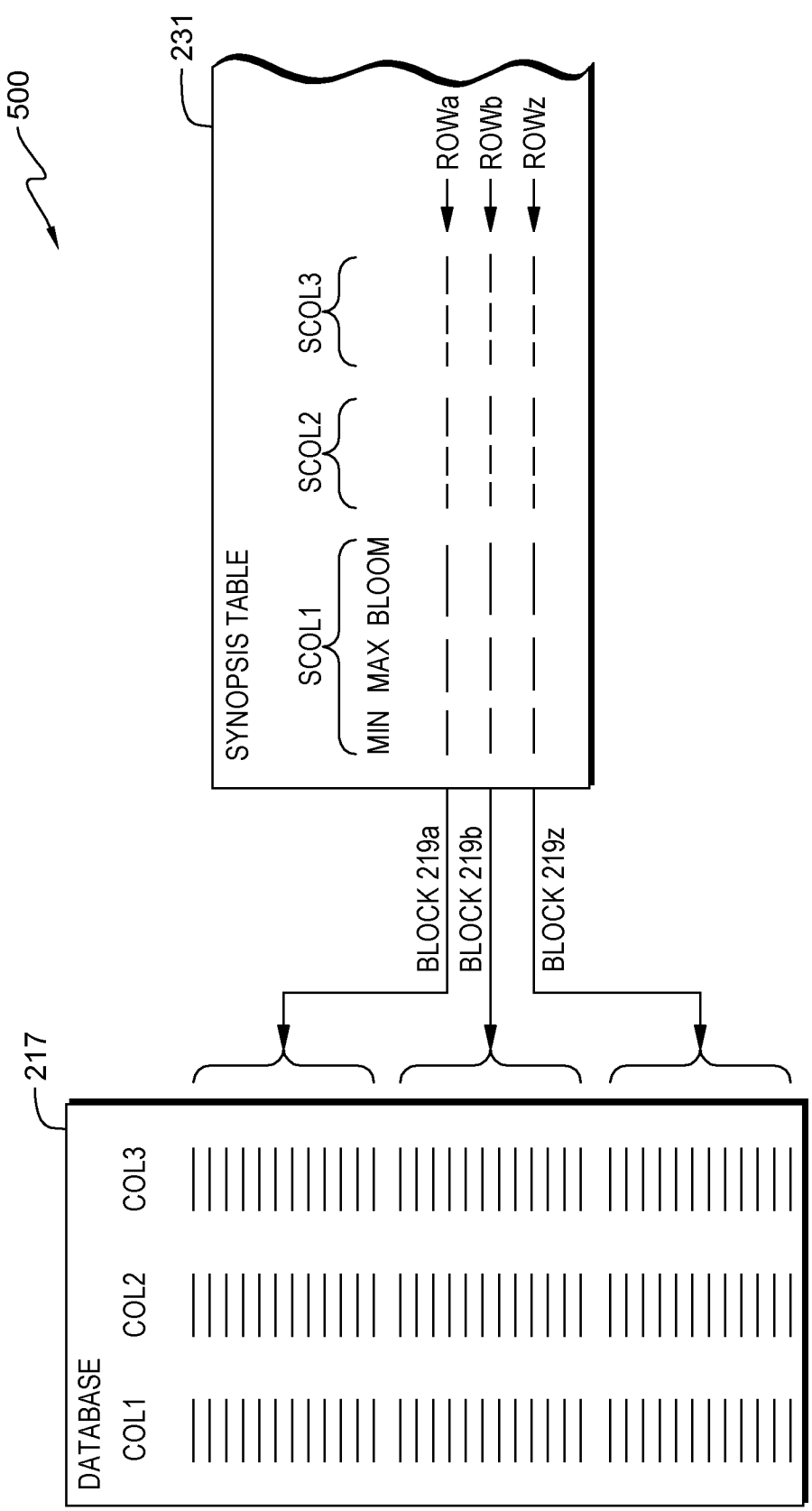
FIG. 5 is a block diagram showing a database table and a corresponding synopsis table that are suitable for use with various embodiments of the present invention.

Block diagram 500 of FIG. 5 shows the relationship of synopsis table 231 to database 217. A tuple in the synopsis table includes at least three columns: (i) a minimum (MIN) column; (ii) a maximum (MAX) column; and a Bloom filter (BLOOM) column. Each tuple in the synopsis table (SCOLn) corresponds to one column (COLm) of the database. For example, SCOL1 corresponds to COL1 of the database; SCOL2 corresponds to COL2 of the database, etc. Each row of the synopsis table corresponds to one block of the database. For example, ROWa corresponds to BLOCK 219a and ROWb corresponds to BLOCK 219b, etc. Generally stated, the intersection of a TUPLE and ROW in the synopsis table characterizes data (minimum, maximum and Bloom filter) in the corresponding column and block of the database. In this embodiment of the present invention, synopsis table 231 includes other columns (not shown), such as record identifiers that identify which database records correspond to each row of the synopsis table.

IV. Definitions

Bloom filter: any probabilistic set of expressions that is used to test whether an element is probable to be included as a member of a set (for example whether a given query value corresponds to a given field value of a database record in a set of database records) based on a Bloom filter value that is calculated based on the values of the members of the set (for example, values for a given field of a given block of records in a database).

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Operational experiential precondition: any type of precondition that is based on the manner in which the synopsis table is used during normal synopsis table operations; preconditions that are based on the content of a synopsis table, rather than the manner in which it is operated are not properly considered as "operational experiential preconditions" as that term is used herein; for example, a synopsis table reorganization precondition based on overlap of ranges of adjacent rows of the synopsis table is a precondition based on content of the synopsis table and the underlying database, and is, therefore, not a precondition of the "operational experiential precondition" type.

What is claimed is:

1. A computer program product comprising a computer readable storage medium having stored thereon:
    first program instructions programmed to receive a synopsis table comprising a plurality of synopsis table records, where the plurality of synopsis table records respectively correspond to a plurality of blocks, with each block of the plurality of blocks corresponding to a set of database records stored in a database, and where each synopsis table record of the synopsis table includes fields having values that characterize data in fields of the respectively corresponding block of database records of the plurality of blocks;
    second program instructions programmed to track a set of usage statistics, including at least a first usage statistic, with each usage statistic of the set of usage statistics relating to usage of the synopsis table and/or usage of the database;
    third program instructions programmed to determine that the set of usage statistics meet a synopsis table re-organization condition, with the synopsis table re-organization condition being an operational experiential type precondition;
    fourth program instructions programmed to determine that the synopsis table re-organization condition has been met; and in response to determining that the synopsis table reorganization condition has been met, fifth program instructions programmed to re-organize the synopsis table, based at least in part, on an amount of storage space occupied by the synopsis table, to create a revised synopsis table;

wherein:

the set of usage statistics includes: a number of records inserted since a last reorganization of the synopsis table, an average number of newly inserted rows inserted in each block in the database, a minimum tuple sequence number (TSN) among inserted records, a maximum TSN among the inserted records, a number of deleted records deleted from the database, a minimum TSN among the deleted records, a maximum TSN among the deleted records, and a list of the deleted records; and the synopsis table configuration corresponds to an N-dimensional database, where N is an integer greater than 2.

2. The computer program product of claim 1 wherein the synopsis table re-organization condition is selected from the group consisting of the following preconditions: (i) a pre-determined number of records are deleted from a block in the database, (ii) a proportion of non-qualifying data, which non-qualifying data does not qualify according to predicates of a set of scans, that is skipped during performance of the set of scans is below a pre-determined threshold, (iii) the database is re-configured, and (iv) a precondition based on the number and/or size of inserts made during insert operations that insert database records into the database.

3. The computer program product of claim 1 further comprising:

upon occurrence of any precondition of a plurality of operational experiential preconditions, sixth program instructions programmed to re-organize the synopsis table;

wherein the plurality of operational experiential preconditions are selected from the group consisting of the following preconditions: (i) a pre-determined number of records are deleted from a block in the database, (ii) a proportion of non-qualifying data, which non-qualifying data does not qualify according to predicate(s) of a set of scan(s), that is skipped during performance of the set of scan(s) is below a pre-determined threshold, (iii) the database is re-configured, and (iv) a precondition based on the number and/or size of inserts made during insert operations that insert database records into the database.

4. The computer program product of claim 1 wherein a synopsis table record includes: a Bloom filter based on values occurring in the corresponding block of database records.

5. The computer program product of claim 4, further comprising:

sixth program instructions programmed to merge a first record of the synopsis table with a second record of the synopsis table to generate a merged record in the revised synopsis table, wherein the first and second records of the synopsis table are adjacent to each other.

6. The computer program product of claim 5, wherein:

the merged record in the revised synopsis table includes the lesser of the respective minima of the first and second records of the synopsis table;

the merged record in the revised synopsis table includes the greater of the respective maxima of the first and second records of the synopsis table; and the merged record in the revised synopsis table includes a Bloom filter that is a bitwise logical OR result of the respective Bloom filters of the first and second records of the synopsis table.

7. The computer program product of claim 1, further comprising:

sixth program instructions programmed to determine that an effectiveness of the synopsis table has fallen below a threshold level of effectiveness with respect to data skipping; and in response to determining that the synopsis table has fallen below the threshold level of effectiveness, seventh program instructions programmed to re-calculate the synopsis table.

8. The computer program product of claim 7, wherein:

the effectiveness of the synopsis table is based on a factor selected from the group consisting of:

a number of false positive Bloom filter comparison results;

a number of false positive minimum/maximum comparison results;

a threshold number of rows have been deleted from the database;

a pre-defined number of rows are inserted into the database since a previous re-calculation of the synopsis table was performed;

a pre-defined number of rows are updated in the database since a previous re-calculation of the synopsis table was performed;

a pre-defined number of rows are deleted from the database since a previous re-calculation of the synopsis table was performed;

a pre-defined number of queries have been performed against the database;

an average latency of database queries rises above a pre-defined threshold;

a proportion of blocks, of the plurality of blocks, that are skipped during database queries declines below a pre-defined threshold; and a pre-defined time interval since a previous re-calculation of the synopsis table has expired.

9. The computer program product of claim 7, wherein data skipping comprises:

eighth program instructions programmed to determine, based on information in the synopsis table, that no database records in a block, of the plurality of blocks, meet a criterion specified in a database query; and in response to determining that no database records in the block meet the criterion specified in the database query, ninth program instructions programmed to skip the block during execution of the database query.

10. A computer system comprising:

a processor(s) set; and a computer readable storage medium;

wherein:

the processor(s) set is structured, located, connected and/or programmed to run program instructions stored on the computer readable storage medium; and the program instructions include:

first program instructions programmed to receive a synopsis table comprising a plurality of synopsis table records, where the plurality of synopsis table records respectively correspond to a plurality of blocks, with each block of the plurality of blocks corresponding to a set of database records stored in a database, and where each synopsis table record of the synopsis table includes fields having values that characterize data in fields of the respectively corresponding block of database records of the plurality of blocks;

second program instructions programmed to track a set of usage statistics, including at least a first usage statistic, with each usage statistic of the set of usage statistics relating to usage of the synopsis table and/or usage of the database;

third program instructions programmed to determine that the set of usage statistics meet a synopsis table re-organization condition, with the synopsis table re-organization condition being an operational experiential type precondition;

fourth program instructions programmed to determine that the synopsis table re-organization condition has been met; and in response to determining that the synopsis table re-organization condition has been met, fifth program instructions programmed to re-organize the synopsis table, based at least in part, on an amount of storage space occupied by the synopsis table, to create a revised synopsis table;

wherein:
the set of usage statistics includes: a number of records inserted since a last reorganization of the synopsis table, an average number of newly inserted rows inserted in each block in the database, a minimum tuple sequence number (TSN) among inserted records, a maximum TSN among the inserted records, a number of deleted records deleted from the database, a minimum TSN among the deleted records, a maximum TSN among the deleted records, and a list of the deleted records; and the synopsis table configuration corresponds to an N-dimensional database, where N is an integer greater than 2.

11. The computer system of claim 10 wherein the synopsis table re-organization condition is selected from the group consisting of the following preconditions: (i) a pre-determined number of records are deleted from a block in the database, (ii) a proportion of non-qualifying data, which non-qualifying data does not qualify according to predicates of a set of scans, that is skipped during performance of the set of scans is below a pre-determined threshold, (iii) the database is re-configured, and (iv) a precondition based on the number and/or size of inserts made during insert operations that insert database records into the database.

12. The computer system of claim 10 further comprising:
upon occurrence of any precondition of a plurality of operational experiential preconditions, sixth program instructions programmed to re-organize the synopsis table;

wherein the plurality of operational experiential preconditions are selected from the group consisting of the following preconditions: (i) a pre-determined number of records are deleted from a block in the database, (ii) a proportion of non-qualifying data, which non-qualifying data does not qualify according to predicate(s) of a set of scan(s), that is skipped during performance of the set of scan(s) is below a pre-determined threshold, (iii) the database is re-configured, and (iv) a precondition based on the number and/or size of inserts made during insert operations that insert database records into the database.

13. The computer system of claim 10 wherein a synopsis table record includes: a Bloom filter based on values occurring in the corresponding block of database records.

14. The computer system of claim 13, further comprising:
sixth program instructions programmed to merge a first record of the synopsis table with a second record of the synopsis table to generate a merged record in the revised synopsis table, wherein the first and second records of the synopsis table are adjacent to each other.

15. The computer system of claim 14, wherein:
the merged record in the revised synopsis table includes the lesser of the respective minima of the first and second records of the synopsis table;
the merged record in the revised synopsis table includes the greater of the respective maxima of the first and second records of the synopsis table; and
the merged record in the revised synopsis table includes a Bloom filter that is a bitwise logical OR result of the respective Bloom filters of the first and second records of the synopsis table.

16. The computer system of claim 10, further comprising:
sixth program instructions programmed to determine that an effectiveness of the synopsis table has fallen below a threshold level of effectiveness with respect to data skipping; and
in response to determining that the synopsis table has fallen below the threshold level of effectiveness, seventh program instructions programmed to re-calculate the synopsis table.

17. The computer system of claim 16, wherein:
the effectiveness of the synopsis table is based on a factor selected from the group consisting of:
a number of false positive Bloom filter comparison results;
a number of false positive minimum/maximum comparison results;
a threshold number of rows have been deleted from the database;
a pre-defined number of rows are inserted, updated, or deleted from the database since a previous re-calculation of the synopsis table was performed;
a pre-defined number of queries have been performed against the database;
an average latency of database queries rises above a pre-defined threshold;
a proportion of blocks, of the plurality of blocks, that are skipped during database queries declines below a pre-defined threshold;
a pre-defined time interval since a previous re-calculation of the synopsis table has expired.

18. The computer system of claim 16, wherein data skipping comprises:
eighth program instructions programmed to determine, based on information in the synopsis table, that no database records in a block, of the plurality of blocks, meet a criterion specified in a database query; and
in response to determining that no database records in the block meet the criterion specified in the database query, ninth program instructions programmed to skip the block during execution of the database query.

* * * * *